United States Patent [19]

Grabois et al.

[11] Patent Number: 5,027,843

[45] Date of Patent: Jul. 2, 1991

[54] USE OF A WATER SOLUBLE DRAG REDUCER IN A WATER/OIL/GAS SYSTEM

[75] Inventors: Ronald N. Grabois, Houston, Tex.; Yung N. Lee, Ponca City, Okla.

[73] Assignee: Conoco Inc., Ponca City, Okla.

[21] Appl. No.: 541,005

[22] Filed: Jun. 19, 1990

[51] Int. Cl.$^5$ .............................................. F17D 1/16
[52] U.S. Cl. ...................................... 137/13; 252/8.55
[58] Field of Search .......................... 137/13; 252/8.55

[56] References Cited

U.S. PATENT DOCUMENTS

| | | | |
|---|---|---|---|
| 3,442,803 | 5/1989 | Hoover | 252/8.55 |
| 3,520,313 | 7/1970 | Seymour | 137/13 |
| 3,692,676 | 9/1972 | Culter | 137/13 |
| 3,710,865 | 1/1973 | Kiel | 137/13 U X |
| 3,868,997 | 3/1975 | Pogers | 137/13 |
| 4,236,545 | 12/1980 | Knight | 137/13 |

*Primary Examiner*—Alan Cohan
*Attorney, Agent, or Firm*—C. R. Schupbach

[57] ABSTRACT

The friction loss in a conduit flowing a mixture of water, oil and gas is reduced by injecting into the mixture a water soluble friction reducing polymer.

7 Claims, No Drawings

USE OF A WATER SOLUBLE DRAG REDUCER IN A WATER/OIL/GAS SYSTEM

BACKGROUND AND SUMMARY OF THE INVENTION

When fluids are flowing through a conduit such as a pipeline or in a production line from a wellhead, friction resulting from the movement of the fluid over inside surface of the conduit causes a loss in pressure which increases as the downstream distance from the driving source increases. Sometimes it is desirable to increase the flow rate of fluids through conduits, but this cannot always be satisfactorily accomplished by installing additional booster pumps. In production lines, particularly offshore, the cost of additional pumping capacity can become prohibitive. The flow rate of the fluid through the conduit can also be increased by reducing the friction of the fluid in the conduit.

One method of reducing friction loss in fluids moving through a conduit is to inject into the fluid a substance which is capable of reducing the pressure or friction loss of the fluid moving through the conduit. Such substance must not only reduce the friction loss of the fluid, but must be compatible with the fluid and must not interfere with the intended use of the fluid.

A variety of polymeric materials have been used or disclosed for use as "friction loss" additives. For example, friction loss in hydrocarbon liquids flowing through pipelines may be reduced by adding to such liquids small amounts of homopolymers or copolymers of alpha olefins. The use of polyisobutylene as a hydrocarbon liquid friction loss reducing agent has also been taught. In addition, a variety of specific polymers and copolymers have been disclosed for use as friction reducing agents.

Since the friction reducer must be compatible with the fluid to which it is added, oil soluble polymers are ordinarily used to reduce the friction loss in flowing hydrocarbon oils. Where the material being transported is a mixture of water and a hydrocarbon oil particularly when it contains substantial amounts of water, a water soluble polymer is frequently used as the friction reducing agent.

THE PRIOR ART

U.S. Pat. No. 3,442,803 to Hoover et al discloses reducing friction in an aqueous oil well fracturing system by dissolving in the aqueous system a small amount of a copolymer of acrylamide and methylene bisacrylamide.

U.S. Pat. No. 3,520,313 to Seymour discloses reducing the pressure drop in a flowing mixture of viscous oil and water by incorporating in the water phase a water soluble polymer. Many polymers, including polymers and copolymers of acrylamide are disclosed for this purpose.

U.S. Pat. No. 3,710,865 to Kiel discloses fracturing a formation with an oil-in water emulsion. The emulsion contains an internal hydrocarbon phase and an external water phase containing a water dispersible polymeric thickening agent which may act as a friction reducing agent. The water dispersible polymer may be a polyacrylamide.

U.S. Pat. No. 4,236,545 to Knight et al. pertains to transporting fluids containing water and hydrocarbons through conduits wherein the water phase contains a water soluble polymer which may be polyacrylamide, obtained by radiation polymerization, which functions as a drag reducing agent. The patent teaches that the fluids for which enhanced friction (drag) reduction can be obtained include water-crude oil mixtures and various such aqueous/hydrocarbon mixtures which may include gases.

THE INVENTION

According to the process of the invention friction loss in a mixture of oil, water and gas flowing through a conduit is reduced by injecting into the mixture a water soluble friction reducing polymer.

DETAILED DESCRIPTION OF THE INVENTION

In accordance with this invention it has been found that the transportation of mixtures of oil, water and gas through a conduit can be facilitated by adding to the mixture a suitable water soluble friction reducing polymeric material. The water soluble polymeric compounds used for this purpose may be selected from a wide variety of materials including homopolymers and copolymers containing polar groups and having a high molecular weight. A wide range of polymers and copolymers of this type include polyacrylamides, polyalkylene oxide polymers and copolymers, copolymers of acrylamide and acrylate esters, copolymers of acrylamide and methacrylate esthers, copolymers of acrylamide and polymers or copolymers of ethylene oxide and/or propylene oxide, mixtures of polyacrylamide polymers and polymers of ethylene oxide and/or propylene oxide, polyvinyl acetates, vinyl sulfonic acid polymers and derivatives thereof. Other materials include natural products such guar gum, polysaccharide and derivatives thereof.

A particularly preferred class of polymers are the polyacrylamides and derivatives thereof. These polymers can be obtained by polymerizing acrylamide with or without suitable comonomers to prepare essentially linear acrylamide polymers. Usually the polymerization is conducted under the influence of a chemical polymerization catalyst such as benzoyl peroxide. These acrylamide polymers are water soluble. In the instance of polyacrylamide, the polymer may be used as obtained after polymerization or the polyacrylamide may be partially hydrolyzed by the reaction thereof with a sufficient amount of a base, such as sodium hydroxide, to hydrolyze a portion of the amid groups present in the polymer molecule.

Under normal conditions the polymeric friction reducers are solids. They are preferably added to the flowing oil/water/gas mixture in a finely divided form. For example, they may be introduced to the mixture as a solid suspension in a light oil such as a mineral oil. Since the polymers are water soluble they may also be mixed with water to form a polymer solution which can then be added to the oil/water/gas mixture. In the process of the invention, the preferred manner of incorporating the polymer into the flowing oil/water/gas mixture is a stable emulsion of water droplets in a light oil, such as mineral oil, the water droplets having polymer dispersed therein. Polymer containing emulsions of this type are comprised of an aqueous phase usually ranging from between about 30 and about 95 percent by weight of the emulsion. The aqueous phase is defined as the sum of the polymer or copolymer and the water present in the composition. The polymer concentration of the emulsion usually varies from about 10 to about 50 percent by weight and more usually between about 25 and about 40 percent by weight of the emulsion. The organic or oil phase of the emulsion is comprised of an inert hydrophobic liquid which usually comprises from about 5 to about 70 percent by weight of the emulsion, and preferably from about 20 to about 35 percent.

The oils used in preparing these emulsions may be selected from a large group of organic liquids which include such materials as liquid hydrocarbons and substituted liquid hydrocarbons. Inclusive of such hydrocarbon liquids are benzene, xylene, toluene, mineral oils kerosines, naphthas and the like.

Any conventional water-in oil emulsifying agent can be used to prepare the emulsions such as sorbitan monostearate, sorbitan, monooleate, and the like. Although the mentioned emulsifiers are used in producing good water-in oil emulsions other surfactants may be employed as long as they are capable of producing stable emulsions. The water-in oil emulsifing agent is usually present in small amounts ranging from about 0.1 to about 10 percent by weight of the emulsion. The water-in oil emulsions may be prepared using any of the conventional procedures which are taught in the art. The types emulsions used in carrying out the process of the invention and their methods of preparation are well known in the art, and do not in themselves constitute a part of the inventive process.

The molecular weight of the polymers and copolymers used as friction reducers in the process of the invention may vary over a wide range, for example, from as low as 100,000 to as high as 50,000,000. The preferred polymers have a molecular weight in excess of 1,000,000 and up to about 10,000,000.

The fluids for which the friction loss can be reduced in the process of the invention include those fluids which have a water phase, oil phase, and gas phase. The water and oil phases may be water and hydrocarbon slurries, emulsions, and micro emulsions or hydrocarbon and water slurries emulsions and micro emulsions. The hydrocarbon may be crude oils including viscous crudes having pour points above about 50° F., partially refined products of crude oil, refined products of crude oil, and any other liquid hydrocarbon materials. The oil phase may include any material containing carbon which is liquid at pipeline conditions, e.g. oils from shale, tar or coal. The oil phase may also contain comminuted solids. The gas phase may comprise normally gaseous hydrocarbons such as those produced from a oil or gas formation, or may be an inert gas such as carbon dioxide which is often used as the gas drive in secondary recovery operation. The process of the invention is particularly applicable to the reduction of friction loss in mixtures of water, crude oil and gas which often occur in the production of crude oil. For example, such mixtures are frequently encountered in production lines from oil producing areas both on shore and off shore. Such mixtures are also found in production lines from both water and gas injection systems in secondary recovery operations. Mixtures of this type are also encountered in water disposal systems in refineries and in production areas.

The use of a water soluble friction reducing polymer in a three phase system of water, oil and gas can be used to increase oil production by lowering pressure at the well head. Another use includes the injection of a water soluble friction reducer into a pipeline moving quantities of oil, water and gas. The friction reducer allows the operator to reduce pressure in the line or increase the flow rate, or a combination of the two. Other uses include downhole injection to reduce friction in the oil well tubing.

The amount of friction reducing polymer added to the mixture of water, oil and gas may vary from about 1 to about 10,000 parts per million based on the liquid present in the flowing mixture. More usually, the amount of polymer added is between about 5 and 1,000 parts per million and preferably from about 10 to about 500 parts per million. The water phase may be the external or internal phase of the flowing mixture. The amount of water in the water phase is preferably at least 20 percent and more preferably at least 30 percent by volume of the total liquid. The amount of gas present in the flowing mixture may vary widely from as low as 10 standard cubic feet per barrel of combined oil and water to as high as 1,000 standard cubic feet per combined barrel of oil and water. Particularly high gas rates are encountered in production lines from areas where secondary recovery with gas injection is being carried out.

The friction reducing polymer is preferably injected into a flowing stream of the water/oil/gas mixture to facilitate mixing of the polymer in the flowing stream. This injection can be carried out using any of the types of apparatus disclosed for this use in the prior art.

The following examples are presented in illustration of the invention.

EXAMPLE 1

A test was conducted in a production line from an offshore platform having a length of 41,500 feet and a diameter of 8 inches The crude oil in the fluid flowing through the production line had an API gravity of 35. The mixture being produced from the off shore platform had a temperature of 135° F. and contained 680 barrels per day of oil, 3,600 barrel per day of water and 3,300 mscf of gas per day. The pressure drop through the production line was measured without the addition of friction reducer and with the addition of a friction reducer material The friction reducing material used was a partially hydrolyzed polyacrylamide in water emulsion in a mineral oil, containing 30 percent active material.

The concentration of friction reducer added to the production line in each test is shown in Table 1. The results of adding the friction reducer in terms of percent reduction in pressure drop are also shown. It is noted that the friction reducer provided a 20 to 35 percent reduction in pressure drop over the base case when no friction reducer was present.

TABLE 1

| RUN NUMBER | FRICTION REDUCER PPM | PRESSURE DROP PSI | % REDUCTION IN PRESSURE DROP |
|---|---|---|---|
| 1 | NONE | 146 | — |
| 2 | 33 | 116.8 | 20 |
| 3 | 66 | 109.5 | 25 |
| 4 | 33 | 125.3 | 21 |
| 5 | 66 | 109.5 | 25 |

The examples shown in Table illustrate that it is possible to obtain an effective reduction in pressure drop through the use of water soluble friction reducing polymers in a three phase system of water, oil and gas.

EXAMPLE 2

A test was conducted in a 4 inch production line having a length of 6450 feet. The crude oil in the fluid flowing through the production line had an API gravity of 34.3. The flowing mixture had a temperature of 100° F. and contained 622 barrels per day of water, 133 barrels per day of oil and 247 mscf of gas per day. The pressure drop through the production line was measured without the addition of friction reducer and with the addition of two different friction reducing materials. One friction reducing material used was a partially hydrolyzed polyacrylamide in water emulsion in a mineral oil, containing 30 percent active material (the same friction reducer used in Example 1). The other friction reducer was similar except that it contained 50 percent active material.

The concentration of friction reducer added to the production line in each test is shown in Table 2. The results obtained in terms of percent reduction in pressure drop are also shown.

TABLE 2

| RUN NO. | FRICTION REDUCER | CONCEN- TRATION PPM | % REDUCTION IN PRESSURE DROP |
|---|---|---|---|
| 1 | NONE | — | — |
| 2 | 50%/Active | 10 | 49 |
| 3 | 50%/Active | 20 | 57.4 |
| 4 | 50%/Active | 30 | 56.8 |
| 5 | 30%/Active | 10 | 54.2 |
| 6 | 30%/Active | 20 | 57.4 |
| 7 | 30%/Active | 30 | 54.6 |

It is noted that both drag reducing materials provided a major reduction in pressure drop, much greater than that obtained in the tests of Example 1. The tests in Example 2 were also carried out with lower concentration of friction reducing material.

It is believed that the difference in the results obtained in the two examples is due to variations in the flow patterns of the liquid-gas mixtures in the examples. It is known that different superficial velocities of liquids and gases in mixtures of these materials produces different flow patterns. The superficial velocity of a liquid in a gas liquid mixture flowing through a conduit is calculated on the basis that only the liquid is present in the conduit. The superficial gas velocity for the flowing mixture is calculated in a similar manner. In Example 1, the superficial liquid velocity is calculated to be 0.67 ft/sec and the superficial gas velocity is determined to vary from 0.87 to 7.3 ft/sec, depending on the pressure at the point of measurement. In Example 2, the superficial liquid velocity is 0.56 ft/sec and the superficial gas velocity ranges from 8.68 to 19.2 ft/sec.

If we consider a liquid flowing through a conduit at the superficial liquid velocities of the two examples, we find that a small amount of gas introduced to the liquid provides a flow pattern in which the liquid is the continuous phase and the gas is present in small bubbles. As the amount of gas introduced to the liquid is increased the bubbles become larger and eventually become elongated in the direction of flow of the liquid gas mixture. When the superficial gas velocity reaches about 7 ft/sec the flow pattern of the mixture changes. The bubbles become sufficiently large that they tend to occupy a large portion of the cross section of the conduit and the mixture moves through the conduit in alternate slugs of gas and liquid. This type of flow continues until the superficial gas velocity reaches 50 to 60 feet per second at which point the velocity of the gas is so great that annular flow is obtained in the conduit. In this type of flow an outer ring of liquid forms within the conduit and the central portion of the conduit contains the high velocity flowing gas.

It is noted that the flow in Example 1 is primarily if not entirely bubble or elongated bubble flow. Whereas, the flow pattern in Example 2 is in the form of alternate slugs of gas and liquid. It is believed that the much greater friction loss reduction obtained in Example 2 is related to these different flow patterns of the two examples. In any event, both examples demonstrate the effectiveness of the use of water soluble friction reducing polymers in a three phase system of water, oil and gas.

While certain embodiments and details have been shown for purpose of illustrating the present invention it will be apparent to those skilled in the art that various changes and modifications may be made herein without departing from the spirit or scope of the invention.

We claim:

1. A process for reducing the fluid flow friction loss of a fluid which is being transported through a conduit comprising a water phase, a gas phase and a hydrocarbon oil phase, which comprises injecting into the fluid a small, friction reducing amount of a water emulsion in a hydrophobic liquid, said water containing a water soluble friction reducing polymer.

2. The process of claim 1 in which the hydrocarbon oil is a crude oil.

3. The process of claim 2 in which the liquid phases of the fluid contain at least 20 percent water.

4. The process of claim 3 in which the aqueous phase of the polymer containing emulsion contains from about 10 to about 50 percent polymer.

5. The process of claim 4 in which the polymer containing water emulsion contains from about 30 to about 95 percent aqueous phase and from about 5 to about 70 percent hydrophobic liquid.

6. The process of claim 5 in which the water soluble polymer is a polyacrylamide polymer.

7. The process of claim 6 in which the amount of polymer injected is between about 5 and about 1,000 ppm based on the water phase of the transported fluid.

* * * * *